Figure 1:
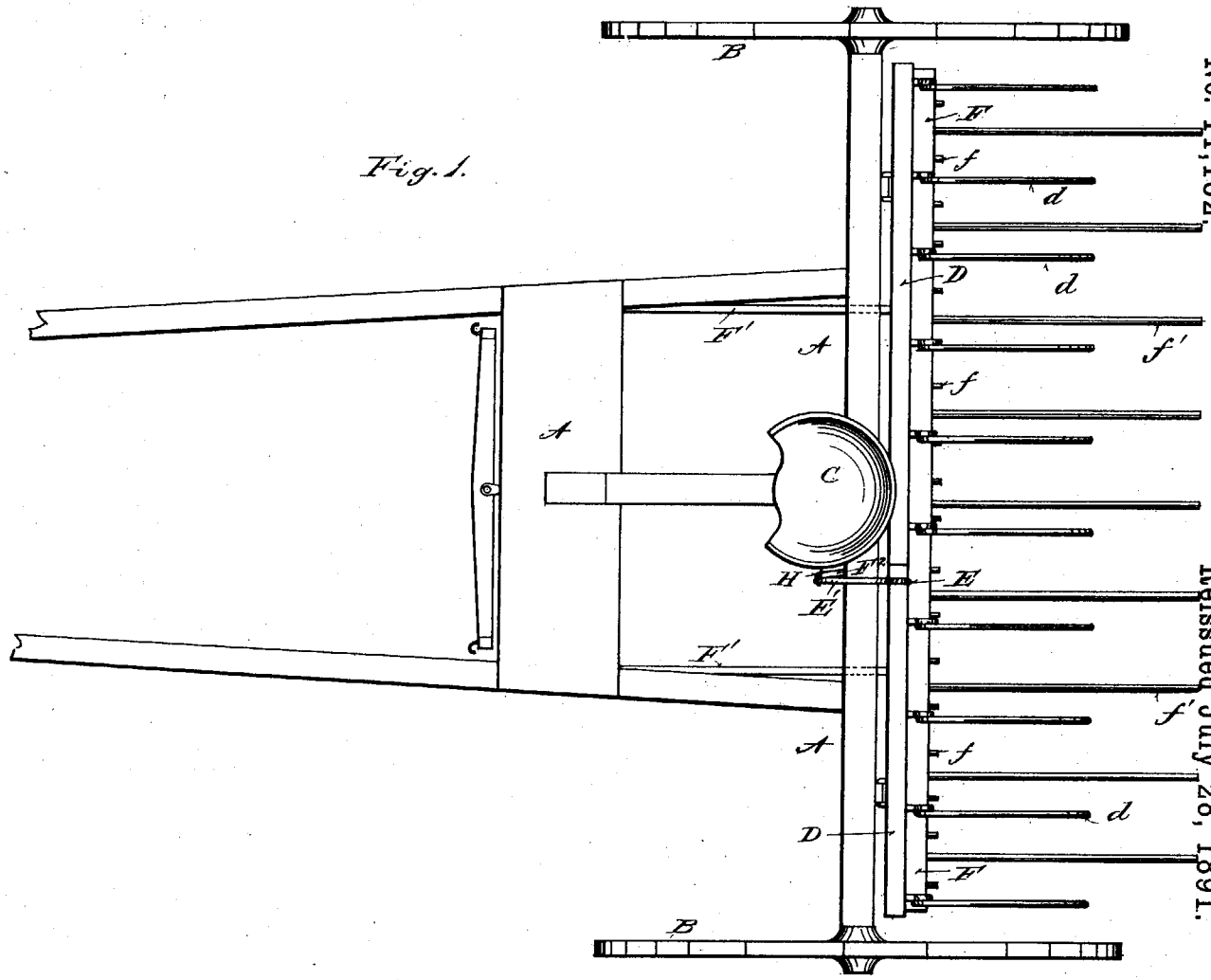

2 Sheets—Sheet 1.

A. H. COLBY.

Assignor to himself and O. W. Owen.

HORSE HAY RAKE.

No. 11,182. Reissued July 28, 1891.

WITNESSES

H. M. Plaisted

J. E. Dawley

INVENTOR

Albert Henry Colby,

By H. A. Toulmin his Attorney.

THE NORRIS PETERS CO., PHOTO-LITHO., WASHINGTON, D. C.

2 Sheets—Sheet 2.
A. H. COLBY.
Assignor to himself and O. W. OWEN.
HORSE HAY RAKE.
No. 11,182. Reissued July 28, 1891.
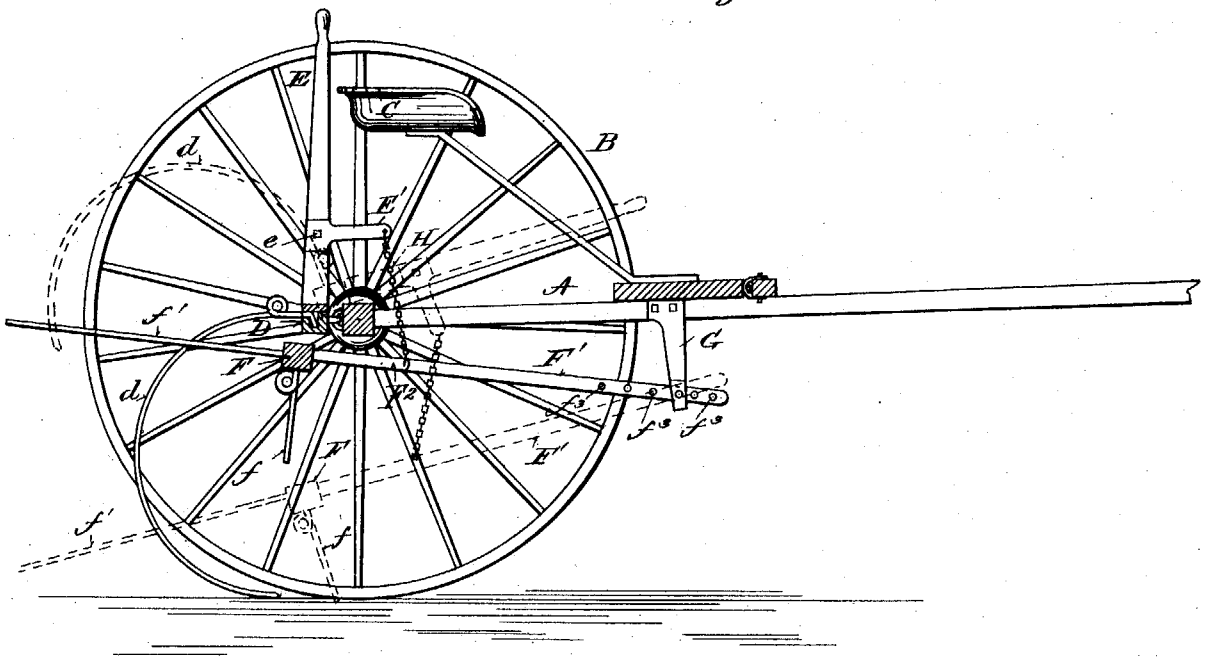
WITNESSES
H. M. Plaisted
J. E. Dawley
INVENTOR
Albert Henry Colby,
By H. A. Goodwin,
his Attorney.
THE NORRIS PETERS CO., PHOTO-LITHO., WASHINGTON, D. C.

UNITED STATES PATENT OFFICE.

ALBERT H. COLBY, OF McHENRY, ILLINOIS, ASSIGNOR TO HIMSELF AND OLIVER W. OWEN, OF SAME PLACE.

HORSE HAY-RAKE.

SPECIFICATION forming part of Reissued Letters Patent No. 11,182, dated July 28, 1891.

Original No. 432,509, dated July 22, 1890. Application for reissue filed April 29, 1891. Serial No. 390,994.

*To all whom it may concern:*

Be it known that I, ALBERT HENRY COLBY, of McHenry, in the county of McHenry, State of Illinois, have invented a new and useful Improvement in Horse Hay-Rakes; and I hereby declare the following to be a full, clear, and exact description of the same.

My invention relates to improvements in hay-rakes of that class which are propelled by horse or other power as contradistinguished from hand-rakes. These rakes as heretofore constructed produce a very wide windrow, or windrow with a space or extension of unraked hay in front of the windrow, as the rake-teeth are necessarily raised from the ground at intervals to dump or unload the gathered hay. Ordinarily the distance traveled by the rake while the teeth are raised in the dumping operation is from six to ten feet, and this of course represents the actual width of the windrow, or of the windrow and its space or extension of unraked hay. The subsequent labor of handling the hay is largely increased by the great width and extent of the windrow, and, further, by the fact of the space covered by the windrow being unraked the hay in this space is left embedded in the stubble as it falls when cut by the mower, and for this reason more difficult to gather it up by hand or with a fork than it would be if this space had been once raked and the hay freed from the stubble by the rake-teeth.

It is the object of my invention to provide a horse-rake which will obviate the difficulty before mentioned and at the same time be of a simple, durable, and efficient and inexpensive construction.

A further object is to so adapt my invention that it may be quickly and cheaply applied to any suitable form or kind of horse hay-rake now commonly in use.

To this end my invention consists in the combination of a horse hay-rake of any well-known or ordinary construction having a wheeled frame and a dumping or raising and lowering rake, with a secondary or supplemental rake mounted upon the same wheeled frame, which operates alternately with the main rake, and is raised and lowered by the same mechanism as that which operates the main rake, said supplemental rake being provided with clearing rods or teeth for clearing the hay from the main rake.

It further consists of the supplemental rake, armed or equipped with clearing rods or teeth for removing the hay from the main rake-teeth, as an attachment.

It also consists in the novel devices and novel combination of parts and devices herein shown and described, and more particularly pointed out in the claims.

In the accompanying drawings, forming a part of this specification, and on which like reference-letters indicate corresponding parts, Figure 1 is a plan or top view of a rake embodying my invention. Fig. 2 is a central section of the same.

In said drawings, A represents the frame of the machine, B its wheels, and C the driver's seat.

D is the rake-head, and *d* the teeth of the usual or main rake, and E its operating lever or handle by which the rake is raised to dump or unload it.

All of these parts are or may be of any ordinary construction now well known to those skilled in the art, and therefore require no detailed description, especially as their particular form and construction are immaterial and not a part of my present invention.

F is the supplemental or secondary rake head, and *f* the teeth of the supplemental or secondary rake. The rake-head F is also provided with clearing rods or teeth *f'* and operate to clear the hay from the teeth of the main rake when the latter is raised or unloaded or dumped to gather the hay. The provision of clearer rods or teeth carried by the supplemental rake is of great importance in practical use, since, besides performing the function of clearing the hay from the main teeth or main rake, such carrying of the clearer-rods by the supplemental rake dispenses with all other means and devices for carrying the clearer-rods. Thus such means and devices are dispensed with and economy of manufacture and cost and simplicity and reduction in the number of parts are secured, while at the same time the important function of the supplemental rake is obtained. The expense of the entire supplemental rake is little, if any, more than the mere expense of the clearer-rods and their usual attachment to the remainder of the machine. Thus by transferring the clearer-rods to the supplemental-rake head it is possible to provide such latter rake-head as an addition to the machine at a cost exceeding but little, if any, the cost of the clearer-rods and the several usual means of connection minus the supplemental rake. I have shown means for and described the alternate action of the supplemental rake and a main rake; but it is obvious that the utility and value of the clearers when carried by or combined with the supplemental rake is not confined to an organization in which are preserved the mechanism and exact mode of operation shown. I therefore lay claim to the supplemental rake, combined with the clearer-rods carried thereby, as constituting of themselves a feature of my invention. While I have shown the clearer-rods as practically straight, or in a line with the arms F′, it is obvious that their direction from the supplemental rake to which they are attached may be otherwise than this, according to what is necessary to enable the clearers to properly clear the main teeth, and according to the construction and arrangement of the devices for actuating the supplemental and main rakes.

As hereinbefore stated, the general parts of the rake shown and described are of the ordinary kind. From this it will be understood that besides my organization or combination my invention also consists of the attachment to old rakes, consisting of the supplemental rake with the clearers carried thereby, such attachment being hereinbefore referred to in the last introductory statement of what my invention consists.

The rake-head is furnished with forwardly-extending rigid arms F′ F′, preferably two in number, which are pivotally connected at their forward ends at the brackets G, secured to the frame A. The operating-lever E of the main rake is provided with an arm E′, to which arm an arm $F^2$, projecting from near the middle of the supplemental-rake head F, is connected by means of a chain or link or other suitable connection H, so that when the main rake is lowered into position for operation, as shown by the heavy lines in Fig. 2, the supplemental rake will be raised out of the way. In like manner when the main rake is raised to unload the gathered hay the supplemental rake will be automatically and by the same movement and mechanism lowered into position for operation. By this means it will be seen that the two rakes operate alternately and that the supplemental rake will gather the hay and rake the space which otherwise would be unraked.

The bracket G is removably attached to the frame A or to the shafts or to any other suitable part of the frame by bolts, and the arm E′ is preferably attached in a similar way by bolts *e* to the lever E, so that the supplemental rake may be readily attached to any ordinary rake, whether new or old, and after it leaves the shop, as well as before. Thus the feature of using my supplemental rake as an attachment for rakes already made will be understood, the clearers being secured to and forming a part of this attachment. It should also be observed that the supplementary rake may be connected to any other suitable movable part of the main rake or its operating mechanism, as well as the lever E, so long as the supplemental rake is made to operate alternately with the main rake. These remarks have reference to the combination formed by combining the supplemental rake and its clearer rods with the organization shown or its equivalent organization. I however prefer to connect the supplemental rake with the operating handle or lever of the main rake, as I deem this the better and more convenient construction, but do not wish to be understood as limiting the use of my attachment composed of the supplemental rake with its clearer-rods to such operating handle or lever, for the attachment composed of these parts is a feature of my invention irrespective of its combination with other parts of the rake.

The supplemental-rake-supporting arms F′ F′ are provided with a series of holes $f^3$ for the purpose of adjusting the supplemental rake attachment, so that it will properly combine with different kinds or makes of rakes.

I claim—

1. The combination, with a wheeled rake-frame, of a main rake and a secondary or supplemental rake operating alternately with the former, said supplemental rake having clearing rods or teeth to clear the hay from the main rake, substantially as specified.

2. The combination, with a wheeled rake-frame, of a main rake and a secondary or supplemental rake operating alternately with the former, and a common operating-lever, with which both rakes are connected and by which they are alternately raised and lowered, said supplemental rake having clearing rods or teeth to clear the hay from the main rake, substantially as specified.

3. An attachment for a hay-rake, comprising a supplemental rake having clearer rods or teeth adapted to clear the hay from the main rake when organized therewith.

4. In a hay-rake, the combination, with a supplemental rake consisting of supporting-bars adapted to connect with the rake proper, a head connected to said bars and carrying rake-teeth, and a series of clearer rods or teeth secured to such head and extending rearwardly therefrom, for the purpose described.

In testimony whereof I affix my signature, in the presence of two witnesses, this 28th day of March, 1891.

ALBERT H. COLBY.

Witnesses:

RICHARD BISHOP,
T. J. WALSH.